US012670457B2

(12) United States Patent
Breedvelt et al.

(10) Patent No.: US 12,670,457 B2
(45) Date of Patent: Jun. 30, 2026

(54) ASSIGNMENT OF ARTIFICIAL INTELLIGENCE USE CASES

(71) Applicant: International Business Machines Corporation, Armonk, NY (US)

(72) Inventors: Ilse Breedvelt, Manotick (CA); Milena Pribic, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 12 days.

(21) Appl. No.: 18/659,466

(22) Filed: May 9, 2024

(65) Prior Publication Data

US 2025/0348816 A1 Nov. 13, 2025

(51) Int. Cl.
*G06Q 10/0635* (2023.01)
*G06N 20/00* (2019.01)

(52) U.S. Cl.
CPC ......... *G06Q 10/0635* (2013.01); *G06N 20/00* (2019.01)

(58) Field of Classification Search
CPC ................................................. G06Q 10/0635
See application file for complete search history.

(56) References Cited

U.S. PATENT DOCUMENTS

| 8,997,052 | B2 | 3/2015 | Bhagavatula |
| 9,769,208 | B2 | 9/2017 | Chari et al. |
| 10,418,023 | B2 | 9/2019 | Jiang et al. |
| 10,437,936 | B2 | 10/2019 | DeFelice |
| 10,509,718 | B2 | 12/2019 | Venkatasubramanian et al. |
| 11,379,529 | B2 | 7/2022 | Fenton et al. |
| 11,411,979 | B2 * | 8/2022 | Bulut .................... H04L 63/102 |
| 11,620,390 | B1 | 4/2023 | Stone et al. |
| 11,853,196 | B1 | 12/2023 | Pandurangarao |
| 12,111,754 | B1 * | 10/2024 | Mysore .................. G06N 20/00 |
| 12,198,030 | B1 * | 1/2025 | Mysore ............... G06F 11/3684 |

(Continued)

OTHER PUBLICATIONS

Conway, et al., "Moonstone: a novel natural language processing system for inferring social risk from clinical narratives." Journal of biomedical semantics 10, No. 1 (2019): 1-10.

(Continued)

*Primary Examiner* — Jeff Zimmerman
(74) *Attorney, Agent, or Firm* — Amin, Turocy & Watson, LLP

(57) ABSTRACT

Systems and techniques that facilitate creation and archiving of controlled structures are provided. For example, one or more embodiments described herein can comprise a system, which can comprise a memory that can store computer executable components. The system can also comprise a processor, operably coupled to the memory that can execute the computer executable components stored in memory. The computer executable components can comprise a first machine learning model that classifies a use case for an artificial intelligence product into a use case category and generates a risk score for the artificial intelligence product based on the use case category, a deployment profile and one or more compliance mandates; and a second machine learning model that performs one or more risk mitigation actions based on the assigned risk score, the deployment profile and the one or more compliance mandates.

17 Claims, 10 Drawing Sheets

(56) References Cited

U.S. PATENT DOCUMENTS

| | | |
|---|---|---|
| 2014/0380277 A1 | 12/2014 | Bhagavatula |
| 2018/0053128 A1* | 2/2018 | Costas .................. G06Q 50/18 |
| 2019/0179732 A1 | 6/2019 | Venkatasubramanian et al. |
| 2021/0216928 A1 | 7/2021 | O'Toole et al. |
| 2025/0078091 A1* | 3/2025 | Munguia Tapia ..... G06N 20/00 |

OTHER PUBLICATIONS

Al-Shabandar, et al., "The application of artificial intelligence in financial compliance management." In Proceedings of the 2019 International Conference on Artificial Intelligence and Advanced Manufacturing, pp. 1-6. 2019.

Mai, et al., "Modeling security and privacy requirements: a use case-driven approach." Information and Software Technology 100 (2018): 165-182.

Silva, et al., "Privacy risk assessment and privacy-preserving data monitoring." Expert Systems with Applications 200 (2022): 116867.

Nyc.gov, "Automated Employment Decision Tools (AEDT)," https://www.nyc.gov/site/dca/about/automated-employment-decision-tools.page, Retrieved from the Internet: Mar. 6, 2024.

Artificialintelligenceact.Eu, "The Act Texts," Final draft (2024), https://artificialintelligenceact.eu/the-act/, Retrieved from the Internet: Mar. 6, 2024.

* cited by examiner

USE CASE CLASSIFICATION SYSTEM 102
DEVELOPMENT USE CASE DETERMINATION MODEL 114
FIRST MACHINE LEARNING MODEL 110
SECOND MACHINE LEARNING MODEL 112
DEPLOYMENT USE CASE DETERMINATION MODEL 214
THIRD MACHINE LEARNING MODEL 210
FOURTH MACHINE LEARNING MODEL 212
TRAINING COMPONENT 216
PROCESSOR 106
MEMORY 108
FIG. 2

300
FIG. 3
COMPLIANCE RISK
SCORE GENERATION
350
USE CASE PROFILE
340
DEVELOPMENT USE
CASE ASSETS
330
USE CASE
DESCRIPTION ASSETS
320
REGULATIONS,
MANDATES AND
ETHICAL PRINCIPLES
310

400

600

Prompt environment

Input

Assume you're an employee who needs a
leave of absence for a mental health case,
and you need to provide information
about their needs.

Generate

Output

Consider regulation 335 or PII information
related to prompts.
Link to regulation
Connect with Risk Compliance officer, Risk Remove prompt Prompt History

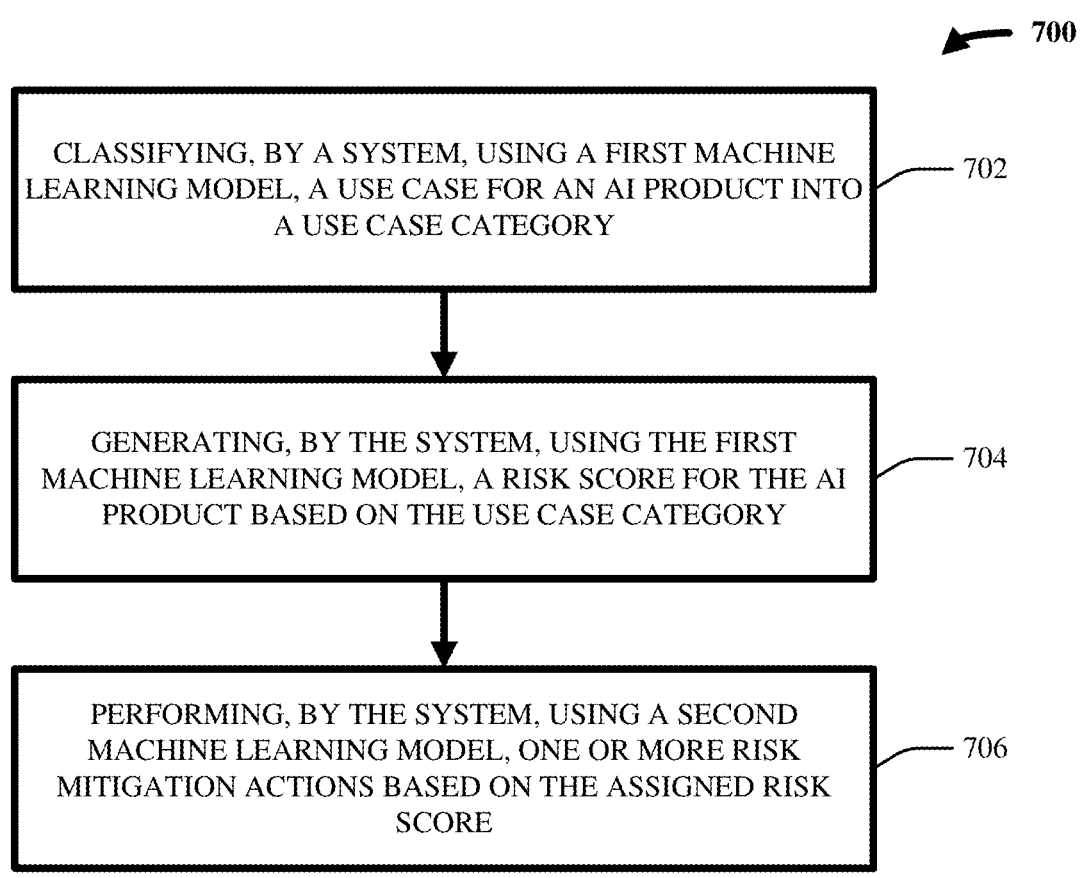

700

CLASSIFYING, BY A SYSTEM, USING A FIRST MACHINE LEARNING MODEL, A USE CASE FOR AN AI PRODUCT INTO A USE CASE CATEGORY — 702

GENERATING, BY THE SYSTEM, USING THE FIRST MACHINE LEARNING MODEL, A RISK SCORE FOR THE AI PRODUCT BASED ON THE USE CASE CATEGORY — 704

PERFORMING, BY THE SYSTEM, USING A SECOND MACHINE LEARNING MODEL, ONE OR MORE RISK MITIGATION ACTIONS BASED ON THE ASSIGNED RISK SCORE — 706

FIG. 7

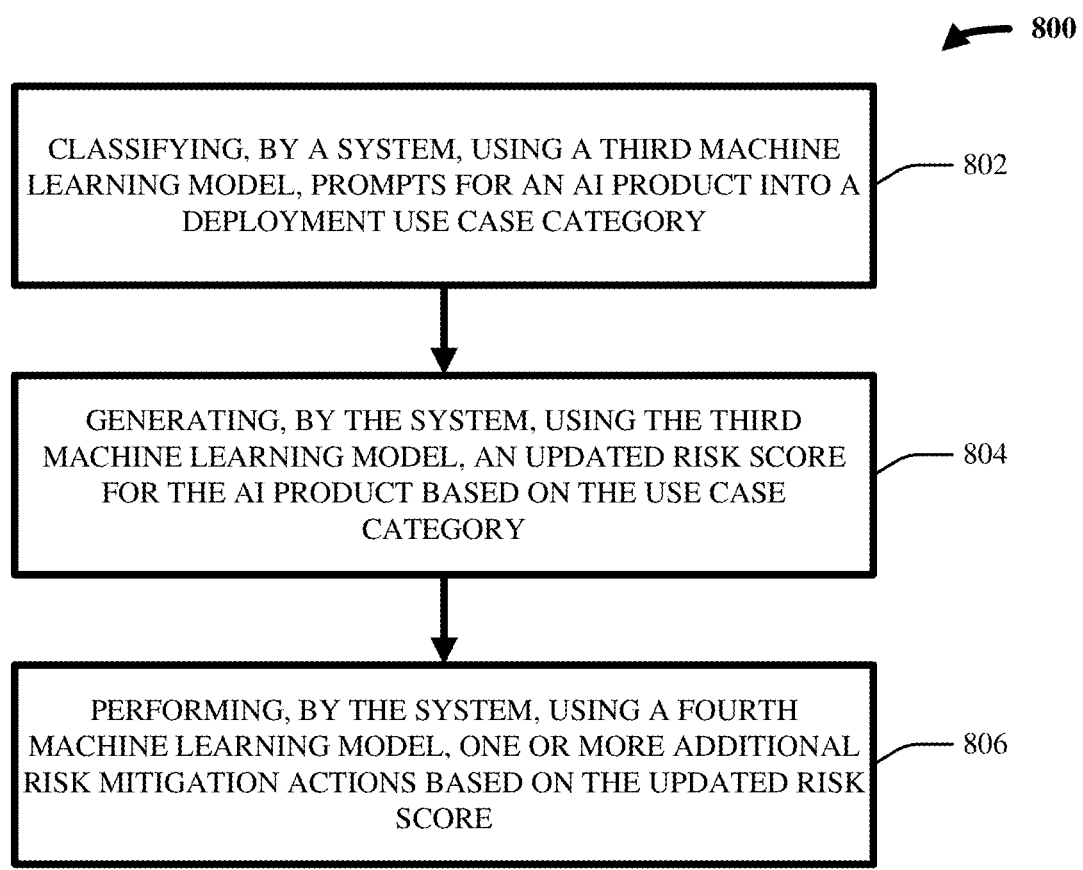

*800*

CLASSIFYING, BY A SYSTEM, USING A THIRD MACHINE LEARNING MODEL, PROMPTS FOR AN AI PRODUCT INTO A DEPLOYMENT USE CASE CATEGORY — 802

GENERATING, BY THE SYSTEM, USING THE THIRD MACHINE LEARNING MODEL, AN UPDATED RISK SCORE FOR THE AI PRODUCT BASED ON THE USE CASE CATEGORY — 804

PERFORMING, BY THE SYSTEM, USING A FOURTH MACHINE LEARNING MODEL, ONE OR MORE ADDITIONAL RISK MITIGATION ACTIONS BASED ON THE UPDATED RISK SCORE — 806

CLASSIFYING, BY A SYSTEM, PROMPTS INTO A DEPLOYMENT USE CASE CATEGORY — 902

COMPARING, BY THE SYSTEM, A USE CASE CLASSIFICATION TO THE DEPLOYMENT USE CASE CLASSIFICATION — 904

ARE THE CLASSIFICATIONS DIFFERENT? — 906

N

Y

IS THERE A HISTORICAL CORRELATION BETWEEN THE CLASSIFICATIONS? — 908

N

Y

RETRAINING, BY THE SYSTEM, A FIRST MACHINE LEARNING MODEL BASED ON THE CORRELATION — 910

1000

COMPUTER  1001

PROCESSOR SET  1010

PROCESSING CIRCUITRY  1020 | CACHE  1021

COMMUNICATION FABRIC  1011

VOLATILE  MEMORY  1012

PERSISTENT STORAGE 1013

OPERATING SYSTEM  1022

USE CASE CLASSIFICATION CODE

1080

PERIPHERAL DEVICE SET  1014

UI DEVICE SET  1023 | STORAGE  1024 | IoT SENSOR SET  1025

NETWORK MODULE  1015

WAN  1002

END USER DEVICE  1003

REMOTE SERVER  1004

REMOTE DATABASE  1030

PRIVATE CLOUD  1006

GATEWAY  1040

PUBLIC CLOUD  1005

CLOUD ORCHESTRATION MODULE  1041 | HOST PHYSICAL MACHINE SET  1042

VIRTUAL MACHINE SET  1043 | CONTAINER SET  1044

FIG. 10

ASSIGNMENT OF ARTIFICIAL INTELLIGENCE USE CASES

BACKGROUND

The subject disclosure relates to artificial intelligence use cases, and more specifically, to automated classification of artificial intelligence uses for risk compliance and mitigation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate classification of artificial intelligence use cases and automated performance of risk mitigation actions.

According to an embodiment, a system can comprise a processor that executes computer executable components stored in memory. The computer executable components can comprise a first machine learning model that classifies a use case for an artificial intelligence product into a use case category and generates a risk score for the artificial intelligence product based on the use case category, a deployment profile and one or more compliance mandates; and a second machine learning model that performs one or more risk mitigation actions based on the assigned risk score, the deployment profile and the one or more compliance mandates.

According to another embodiment, a computer-implemented method can comprise classifying, by a system operatively coupled to a processor, using a first machine learning model, a use case for an artificial intelligence product into a use case category; generating, by the system, using the first machine learning model, a risk score for the artificial intelligence product based on the use case category, a deployment profile and one or more compliance mandates; and performing, by the system, using a second machine learning model, one or more risk mitigation actions based on the assigned risk score, the deployment profile and the one or more compliance mandates.

According to another embodiment, a computer program product can comprise a computer readable storage medium having program instructions embodied therewith, the program instructions executable by a processor to cause the processor to classify, by the processor, using a first machine learning model, a use case for an artificial intelligence product into a use case category; generate, by the processor, using the first machine learning model, a risk score for the artificial intelligence product based on the use case category, a deployment profile and one or more compliance mandates; and perform, by the processor, using a second machine learning model, one or more risk mitigation actions based on the assigned risk score, the deployment profile and the one or more compliance mandates.

DESCRIPTION OF THE DRAWINGS

FIGS. 1 and 2 illustrate block diagrams of example, non-limiting, systems that can facilitate classification of use cases and performance of risk mitigation actions in accordance with one or more embodiments described herein.

FIG. 3 illustrates a flow chart of an example, non-limiting, artificial intelligence use case categorization method in accordance with one or more embodiments described herein.

FIG. 7 illustrates a flow diagram of an example, non-limiting, computer implemented method that facilitates classification of AI use cases during development in accordance with one or more embodiments described herein.

FIG. 8 illustrates a flow diagram of an example, non-limiting, computer implemented method that facilitates classification of prompts fed to AI during deployment in accordance with one or more embodiments described herein.

FIG. 10 illustrates an example, a non-limiting environment for the execution of at least some of the computer code in accordance with one or more embodiments described herein.

DETAILED DESCRIPTION

Figure 1:
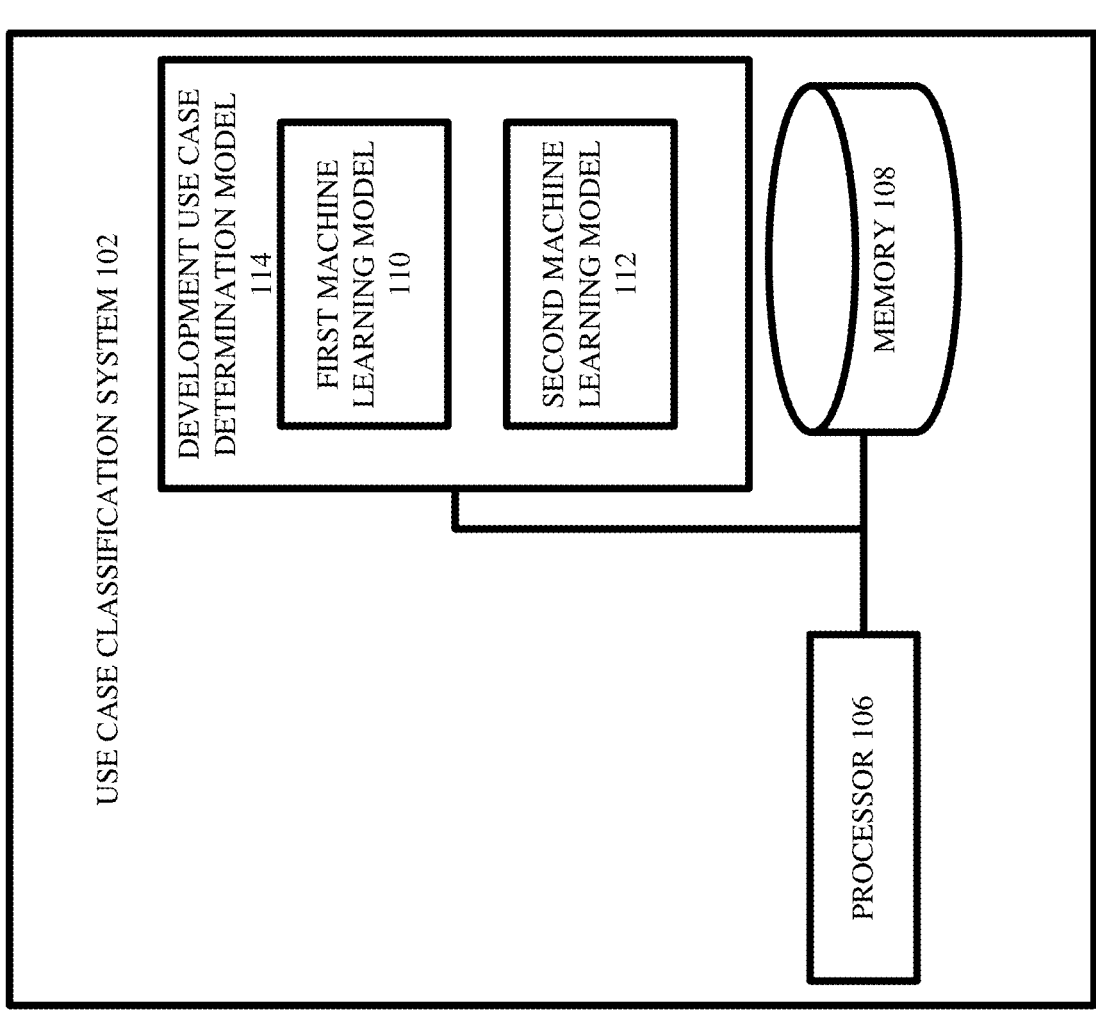

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

As referenced herein, an "entity" can comprise a client, a user, a computing device, a software application, an agent, a machine learning (ML) model, an artificial intelligence (AI) model, and/or another entity.

Within the sphere of machine learning, there are increasing ethical and legal considerations in regards to both the use cases that artificial intelligence products are developed for, and the what they are actually used for after deployment. Currently, EU law defines multiple levels of use case risk with corresponding levels of regulations that must be complied with. For example, use cases that are considered "high risk" are completely banned from deployment and use within the EU. At the opposite end of the spectrum, use cases that are defined as "low risk" have few to no restrictions. Additionally, models that are considered high-impact general use model (e.g., models that have a processing capability above a specified threshold) are considered general purpose risks and are subject to restrictions based on the actual usage of the model (e.g., what prompts are asked of the model). Similarly, other jurisdictions, such as New York state, have implemented regulations that require auditing of machine learning models used for certain types of tasks or environments. Furthermore, many private organizations are beginning to develop internal ethical considerations for what use cases and purposes the organizations will utilize artificial intelligence. Due to the rapid speed of AI development and usage, auditing of every AI model, use case, and/or prompt within an organization or development team is not possible. Additionally, artificial intelligence products are increasingly utilized for tasks different than those the product was designed for. This inability to properly predict future use cased leads to compliance issues when the deployment use case of the artificial intelligence product (e.g., the tasks the artificial intelligence product is utilized for after development) differ from the original use case the product was devised for.

In view of the problems discussed above, the present disclosure can be implemented to produce a solution to one or more of these problems by classifying, by a system operatively coupled to a processor, using a first machine learning model, a use case for an artificial intelligence product into a use case category, generating, by the system, using the first machine learning model a risk score for the artificial intelligence product based on the use case category, a deployment profile and one or more compliance mandates, and performing, by the system, using a second machine learning model, one or more risk mitigation actions based on the assigned risk score, the deployment profile and the one or more compliance mandates. By generating a risk score based on the described use case, the second machine learning model can perform an appropriate risk mitigation action during development of the artificial intelligence product, rather than waiting until the product is ready for deployment when it may not be possible to make appropriate mitigation actions. In one or more embodiments, the risk mitigation actions can comprise at least one of blocking further development of the artificial intelligence product, blocking the artificial intelligence product from answering one or more prompts, notifying one or more entities of compliance requirements, and generation of one or more audits.

In one or more embodiments, a further solution to these problems can comprise storing, by the system, prompts given to the artificial intelligence product, classifying, by the system, using a third machine learning model, the prompts into a deployment use case category, generating, by the system, using the third machine learning model, an updated risk score for the artificial intelligence product based on the deployment use case category, the deployment profile and the one or more compliance mandates, and performing, by the system, using a fourth machine learning model, one or more additional risk mitigation actions based on the assigned updated risk score, the deployment profile and the one or more compliance mandates. By classifying the prompts given to the AI product during deployment, a comparison can be made to determine if the AI product is actually being used for the same use case as the one described during development. In the event that the AI product is being used for a different use case, the fourth machine learning model can automatically perform one or more additional risk mitigation actions to ensure compliance with legal and/or ethical considerations related to the deployment use case. In a further embodiment, a comparison of the development use case and the deployment use case can be utilized to retrain the first machine learning model to enable more accurate classifications of use case categories.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIGS. 1 and 2 illustrate block diagrams of example, non-limiting use classification systems 102 and 202 that can facilitate classification of artificial intelligence use cases and enable automated risk mitigation actions. Aspects of systems (e.g., systems 102, 202 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines, e.g., computers, computing devices, virtual machines, etc. can cause the machines to perform the operations described. System 102 can comprise development use case determination model 114, processor 106 and memory 108. Development use case determination model 114 can further comprise first machine learning model 110 and second machine learning model 112. In addition to the elements described in relation to system 102, system 202 can further comprise training component 216, deployment use case determination model 214, which can comprise third machine learning model 210 and fourth machine learning model 212.

In various embodiments, systems 102 and 202 can comprise a processor 106 (e.g., a computer processing unit, microprocessor) and a computer-readable memory 108 that is operably connected to the processor 106. The memory 108 can store computer-executable instructions which, upon execution by the processor, can cause the processor 106 and/or other components of the systems 102 and 202 (e.g., first machine learning model 110, second machine learning model 112, third machine learning model 210, training component 216 and/or fourth machine learning model 212) to perform one or more acts. In various embodiments, memory 108 can store computer-executable components (e.g., first machine learning model 110, second machine learning model 112, third machine learning model 210, component 216 and/or fourth machine learning model 212) and the processor 106 can execute the computer-executable components.

According to some embodiments, first machine learning model 110, second machine learning model 112, third machine learning model 210 and fourth machine learning model 212 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, first machine learning model 110, second machine learning model 112, third machine learning model 210 and fourth machine learning model 212 can employ principles of probabilistic and decision theoretic inference to determine one or more responses based on information retained in a knowledge source database. In various embodiments, first machine learning model 110, second machine learning model 112, third machine learning model 210 and fourth machine learning model 212 can employ a knowledge source database comprising artificial intelligence use case categories and appropriate risk mitigation actions. Additionally, or alternatively, first machine learning model 110, second machine learning model 112, third machine learning model 210 and fourth machine learning model 212 can rely on predictive models constructed using machine learning and/or automated learning procedures. Logic-centric inference can also be employed separately or in conjunction with probabilistic methods. For example, decision tree learning can be utilized to map observations about data retained in a knowledge source database to derive a conclusion as to a response to a question.

As used herein, the term "inference" refers generally to the process of reasoning about or inferring states of the system, a component, a module, the environment, and/or assessments from one or more observations captured through events, reports, data, and/or through other forms of communication. Inference can be employed to identify a specific context or action, or can generate a probability distribution over states, for example. The inference can be probabilistic. For example, computation of a probability distribution over states of interest can be based on a consideration of data and/or events. The inference can also refer to techniques employed for composing higher-level events from one or more events and/or data. Such inference can result in the construction of new events and/or actions from one or more observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects. Furthermore, the inference processes can be based on stochastic or deterministic methods, such as random sampling, Monte Carlo Tree Search, and so on.

The various aspects can employ various artificial intelligence-based schemes for carrying out various aspects thereof. For example, a process for determining text segmentation boundaries, text capitalization and punctuation, without interaction from the target entity, which can be enabled through an automatic classifier system and process.

A classifier is a function that maps an input attribute vector, x=(x1, x2, x3, x4, xn), to a confidence that the input belongs to a class. In other words, f(x)=confidence(class). Such classification can employ a probabilistic and/or statistical-based analysis (e.g., factoring into the analysis utilities and costs) to prognose or infer an action that should be employed to make a determination. The determination can include, but is not limited to, what category a use case belongs to, what risk score an artificial intelligence product should be assigned, and/or what risk mitigation actions should be executed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing and recording target entity behavior, by receiving extrinsic information, and so on). For example, SVM's can be configured through a learning phase or a training phase within a classifier constructor and feature selection module. Thus, a classifier(s) can be used to automatically learn and perform a number of functions, including but not limited to classification of use cases, generation of risk scores and/or performance of risk mitigation actions. Furthermore, one or more aspects can employ machine learning models that are trained utilizing reinforcement learning. For example, penalty/reward scores can be assigned for various outputs generated first machine learning model 110, second machine learning model 112, third machine learning model 210 and fourth machine learning model 212 based on defined entity preferences. Accordingly, first machine learning model 110, second machine learning model 112, third machine learning model 210 and fourth machine learning model 212 can learn via selecting options with lower penalties and/or higher rewards in order to reduce an overall penalty score and/or increase an overall reward score.

In one or more embodiments, first machine learning model 110 can classify a use case for an artificial intelligence product into a use category. For example, an entity can provide a description of intended use case for an artificial intelligence product in development and a development profile for the artificial intelligence product in development. The development profile can comprise information about the geography or jurisdiction where the product will be deployed, a business domain the product will be utilized in, and what target entity the product is being developed for. As used herein "target entity" refers to an entity that is expected to use the machine learning model after development. Based on this information first machine learning model 110 can classify the description of the intended use case for the artificial intelligence product into a use case category. In one or more embodiments, the entity can provide the use case categories to first machine learning model 110. Examples of use case categories included public relations uses, human resources usages, data analysis usage, human to system interactions, biometric identification usage, general purpose usage and/or other use case categories. In some embodiments, first machine learning model 110 can utilize semantic enrichment to ask the entity for additional information in order to properly classify the use case. This additional information can comprise development assets including, but not limited to, information related to the processing power of the artificial intelligence product in development, the types of training data for the artificial intelligence product, and/or other documents or information related to the artificial intelligence product. Based on this information, the first machine learning model can classify the description of the use case into an appropriate use case category.

The first machine learning model 110 can generate a risk score for the artificial intelligence product based on the use case category, the deployment profile and one or more compliance mandates. The compliance mandates can comprise a set of uploaded compliance requirements for various geographic jurisdictions as well as ethics requirements both for the entity developing the artificial intelligence product and for target entities described in the deployment profile as intended users of the artificial intelligence product. Using the deployment profile, first machine learning model 110 can select one or more relevant compliance mandates from the one or more compliance mandates. For example, if the deployment profile specifies that the artificial intelligence product will be deployed within a country in the EU, first machine learning model 110 can select relevant one or more compliance mandates based on EU law regarding artificial intelligence. Using the one or more relevant compliance mandates and the use case category, first machine learning model 110 can generated a risk score for the artificial intelligence product based on severity of non-compliance with the one or more relevant compliance mandates and difficulty of compliance requirements. In one or more embodiments, the severity of non-compliance can consider factors such as legal penalties, monetary fines, or refusal of usage by specific entities. In one or more embodiments, the difficulty of compliance can comprise factors such as auditing requirements, record keeping requirements, who the usage of the AI model must be disclosed to and/or other factors. For example, if the relevant compliance mandates specify that use case category is prohibited in the geographic region or jurisdiction identified in the deployment profile, first machine learning model 110 can assign a high risk score to the artificial intelligence product. In another example, if the relevant compliance mandates specify that relevant jurisdictions require a yearly audit for the use case category, first machine learning model 110 can assign a low risk score while a different use case category that calls for an audit every six months can be assigned a moderate risk score.

In one or more embodiments, second machine learning model 112 can perform one or more risk mitigation actions based on the assigned risk score, the deployment profile and the one or more compliance mandates. The one or more mitigation actions can comprise blocking further development of the artificial intelligence product, blocking the artificial intelligence product from answering one or more prompts, notifying one or more entities of compliance requirements, generation of an audit schedule, generation of one or more compliance audits and/or mitigation actions. For example, if an artificial intelligence product is assigned a high risk score, second machine learning model 112 can lock the artificial intelligence product from further development and/or notify the entity developing the artificial intelligence product of compliance requirements or relevant legal and/or ethical considerations from the one or more relevant compliance mandates. In another example, if an artificial intelligence product is assigned a moderate risk score, second machine learning model 112 can generate an audit schedule of that specifies how often compliance audits are to be performed on the artificial intelligence program and what authority the compliance audits are to be submitted to. In some embodiments, the performed risk mitigation actions can be based on the relevant compliance mandates used by first machine learning model 110 to generate the risk score. For example, if the relevant compliance mandates specify that an audit for the use case must be filed with an authority, second machine learning model 112 can notify as entity that handles compliance matters of the requirement to file the audit. In a further example, second machine learning model 112 can utilize information from the development assets and the deployment profile of the artificial intelligence product to automatically generate the audit and then submit the audit.

In one or more embodiments, third machine learning model 210 can store prompts given to the artificial intelligence product during deployment. In some cases, an artificial intelligence product may be utilized for purposes other than the use case described during development. Accordingly, by storing prompts, the actual deployment use case of the artificial intelligence product can be tracked. The third machine learning model 210 can classify the stored prompts into one or more deployment use case categories. For example, third machine learning model 210 can utilize natural language processing to classify one or more prompts into a deployment use case category. In one embodiment, third machine learning model 210 can classify prompts one at a time. In another embodiment, third machine learning model 210 can classify grouping of prompts together into a shared deployment use case category. In some embodiments, the deployment use case categories can comprise the same categories as the development use case categories.

Third machine learning model 210 can generate an updated risk score for the artificial intelligence product based on the deployment use case category, the deployment profile and the one or more compliance mandates. Using the deployment profile, third machine learning model 210 can select one or more appropriate compliance mandates from the one or more compliance mandates. Third machine learning model 210 can then use the selected one or more compliance mandates, and the deployment use case category to generate an updated risk score based on severity of non-compliance with the one or more compliance mandates and/or difficulty in complying with the one or more deployment compliance mandates. Similar to as described above in relation to first machine learning model 110, the severity of non-compliance can consider factors such as legal penalties, monetary fines, or refusal of usage by specific entities and the difficulty of compliance can comprise factors such as auditing requirements, record keeping requirements, who the usage of the AI model must be disclosed to and/or other factors. In one or more embodiments, third machine learning model 210 can repeat the updated risk score generation in response to an upload of an additional compliance mandate or an update to an existing compliance mandate. For example, third machine learning model 210 can receive one or more updated compliance mandates for one or more jurisdictions and/or target organizations. Third machine learning model can then generate a second updated risk score for the artificial intelligence product based on the deployment use case category, the deployment profile and the one or more updated compliance mandates. This enables the updated risk score to stay up to date with changing compliance mandates and regulations automatically, thereby enabling more accurate compliance than is otherwise possible.

In one or more embodiments, fourth machine learning model 212 can perform one or more additional risk mitigation actions based on the assigned updated risk score, the deployment profile and the one or more compliance mandates. The one or more mitigation actions can comprise blocking further development of the artificial intelligence product, blocking the artificial intelligence product from answering one or more prompts, notifying one or more entities of compliance requirements, generation of an audit schedule, generation of one or more compliance audits and/or mitigation actions. For example, if based on one or more prompts the artificial intelligence product is assigned a high risk score and relevant compliance mandates specify that deployment use category calls for audits, then fourth machine learning model 212 can automatically generate an audit or report on the artificial intelligence product based on the stored prompts. In another embodiment, if the one or more compliance mandates specify that the prompts fall under a heavily regulated or banned usage category, fourth machine learning model 212 can block the artificial intelligence product from answering similar prompts in the future, flag the stored prompts and/or notify one or more entities of the flagged prompts. In one or more embodiments, the performance of the one or more additional risk mitigation actions can be based on a comparison between the use case classification by first machine learning model 110 and the deployment use case classification by third machine learning model 210. For example, if the use case classifications and the risk scores are the same, then fourth machine learning model 212 can choose to take no additional risk mitigation action.

In one or more embodiments, training component 216 can retrain first machine learning model 110 based on a comparison of the use case category classification by first machine learning model 110 and the deployment use case category classification by third machine learning model 210. In the deployment of artificial intelligence products, it is possible that products with a specific development use case often will get utilized in a different deployment use case. For example, artificial intelligence products with a development use case related to public relations purpose may often in fact be utilized in human resources usages during deployment. In order to address this issue, training component 216 can compare the use case classifications from first machine learning model 110 to the deployment use case classifications from third machine learning model 210. Training component 216 can then identify cases where artificial intelligence products given a first use case classification are often given a second deployment use case classification. Training component 216 can then use these associations to generate new training data for first machine learning model 110. For example, given that artificial intelligence products assigned a first use case category during development are often assigned a second use case category during deployment, first machine learning model 110 can then be updated via training to associate the first use case category and the second use case category. Accordingly, if first machine learning model 110 classifies an artificial intelligence product as the first use case category, first machine learning model 210 can additionally classify the artificial intelligence product as the second use case category. By proactively making the second use case category classification, first machine learning model 110 can enable second machine learning model 112 to take more appropriate risk mitigation actions, thereby reducing the likelihood that fourth machine learning model 212 will take additional risk mitigation actions during deployment and thus the workload of the fourth machine learning model. Further, by retraining first machine learning model 110, first machine learning model 110 is able to make accurate predictions as to future use cases of artificial intelligence products, thereby enabling more proactive compliance measures.

FIG. 3 illustrates a flow chart 300 of an example, non-limiting, artificial intelligence use case categorization method in accordance with one or more embodiments described herein.

At 310 an entity developing an artificial intelligence product can upload one or more regulations, mandates and/or ethical principles for use in generating a risk score. For example, the regulations, mandates and/or ethical principles can comprise legal regulations for one or more legal jurisdictions and/or ethical standards for AI use from at least one of the entity developing the artificial intelligence product or the target entity who the artificial intelligence product is being developed for. At 320, an entity can provide a use case description for artificial intelligence. In one or more embodiments, first machine learning model 110 can utilize semantic enrichment to ask the entity for additional information about the use case description. At 330, an entity can upload one or more development use case assets to first machine learning model 110. These assets can comprise training data for the artificial intelligence product, example prompts, information about the computation power of the artificial intelligence product, the geographic region the artificial intelligence product will be deployed in and/or other information related to the development of the artificial intelligence product. At 340, first machine learning model 340 can generate a use case profile for the artificial intelligence. The use case profile can comprise a use case category classification generated by first machine learning model 110 and information gathered from the development use case assets. At 350, first machine learning model 110 can generate a risk score for the artificial intelligence product based on the use case profile and the regulations, mandates and ethical principles as described above in relation to FIGS. 1 and 2. Based on the risk score, second machine learning model 112 can take one or more risk mitigation actions. In one or more embodiments, the risk mitigation actions can comprise prompting the entity for more information about the use case and/or additional development assets notifying one or more entities of potential compliance risk, blocking further development, and/or generating one or more compliance audits. Based on the additional information and/or additional development assets, first machine learning model 110 can loop back to 340 to update the use case profile and generate an updated risk score at 350.

Figure 4:
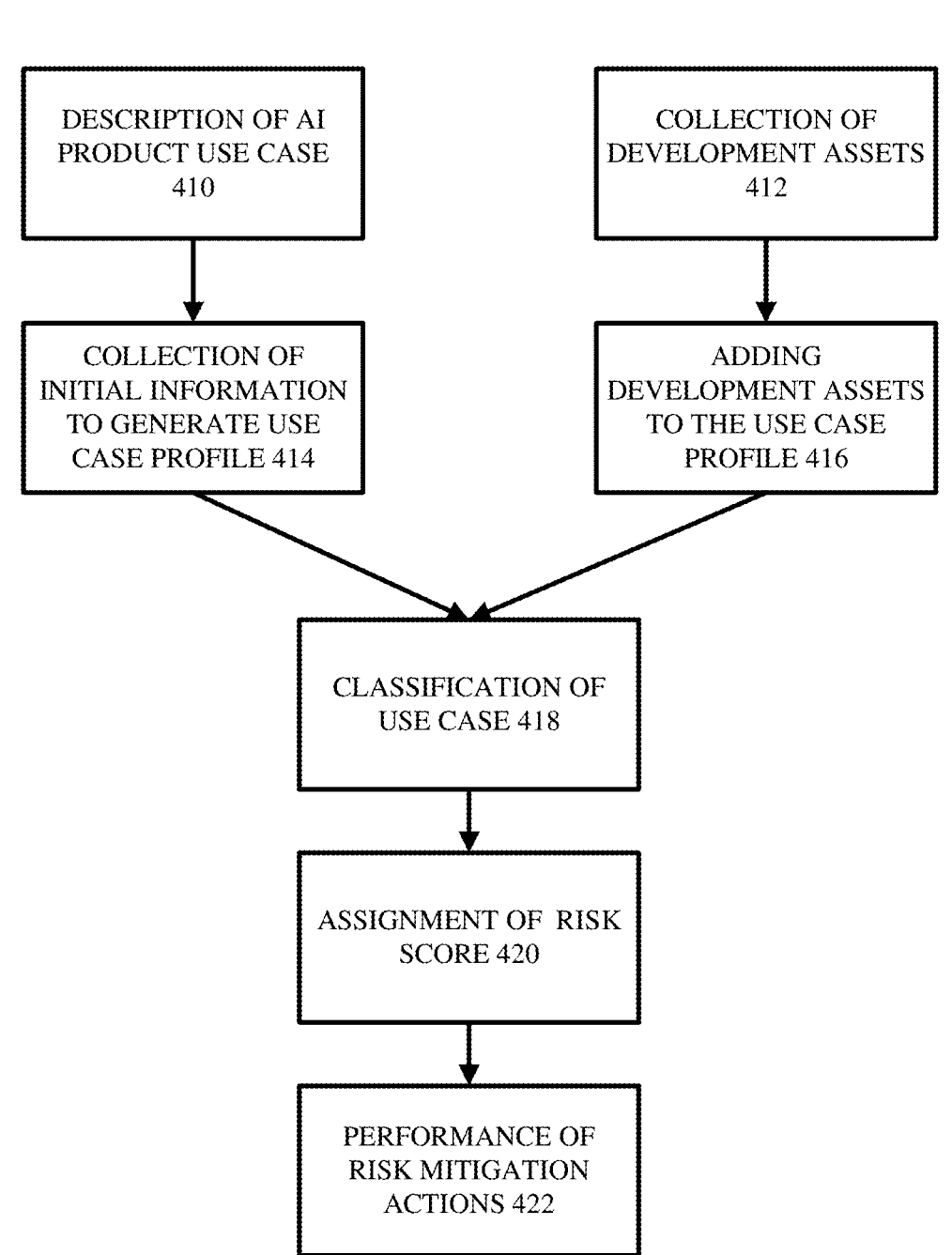
FIG. 4 illustrates a flow diagram of an example, non-limiting, artificial intelligence use case categorization and risk mitigation action performance in accordance with one or more embodiments described herein.

FIG. 4 illustrates a flow diagram 400 of an example, non-limiting, artificial intelligence use case categorization and risk mitigation action performance in accordance with one or more embodiments described herein. At 410 an entity can provide a use case description for an artificial intelligence product. At 412, development assets (e.g., training data, information on processing power, model structure and/or example prompts) can be collected. At 414, a use case profile can be generated using the use case description and other information collected from the entity such as a geographic region for deployment and a target entity or organization. At 416, the development assets can be added to the use case profile. At 418, the use case can be classified into a use case category as described above in relation to FIGS. 1 and 2. At 420, a risk score can be assigned to the artificial intelligence product as described above in relation to FIGS. 1 and 2. At 422, one or more risk mitigation actions can be performed based on the risk score and the use case profile as described above in relation to FIGS. 1 and 2.

Figure 5:
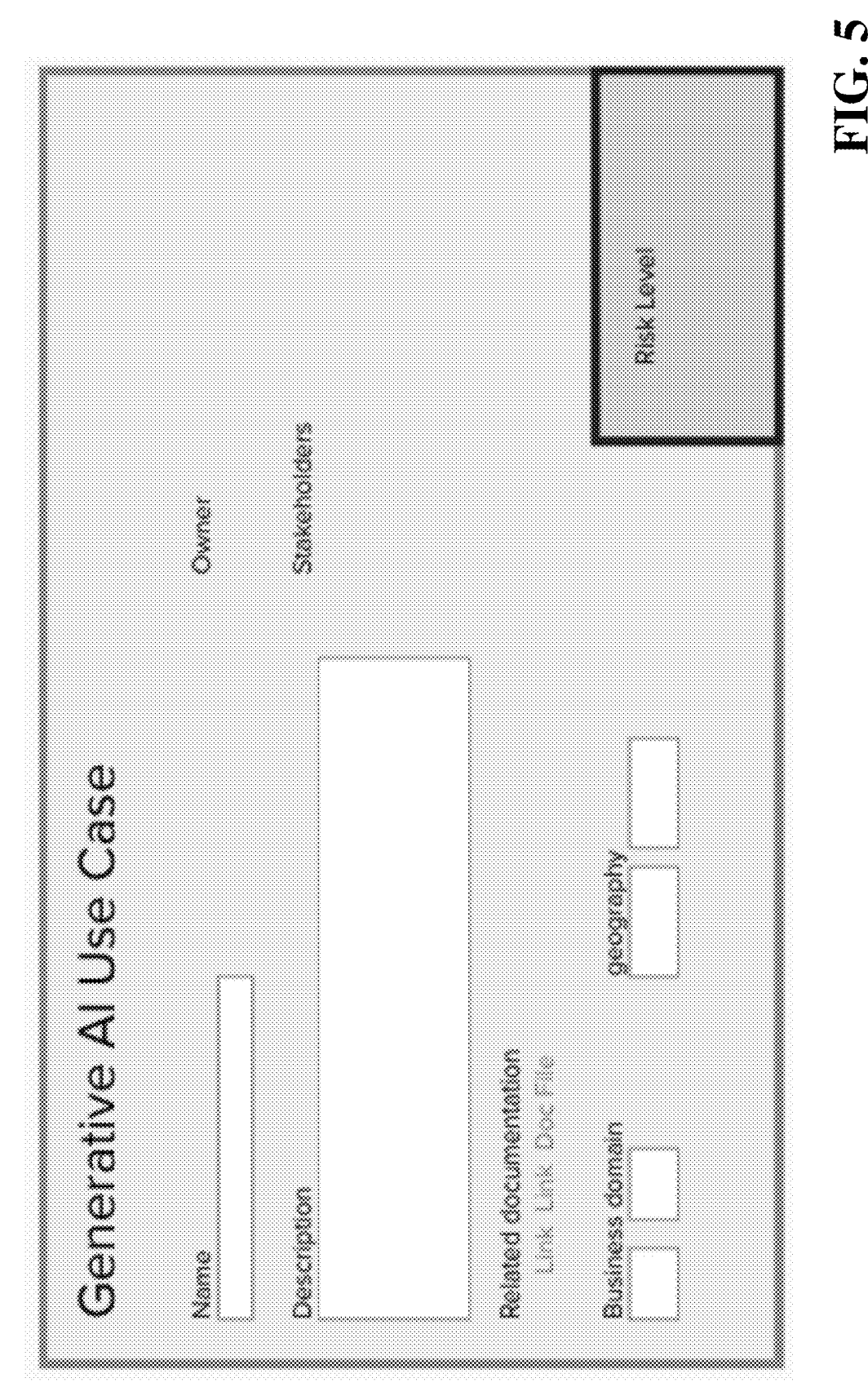
FIG. 5 illustrates an example of use case description input in accordance with one or more embodiments described herein.

FIG. 5 illustrates an example of use case description input 500 in accordance with one or more embodiments described herein. As shown, the use case description input 500 can comprise a name for the artificial intelligence product, an entity provided description, a business domain for the artificial intelligence use case, a geographic region for deployment of the artificial intelligence use case, an owner (e.g., a target entity or organization for the artificial intelligence product), related documentation (e.g., development assets and/or additional information) and stakeholders (e.g., the entity developing the artificial intelligence product). Based on this input, first machine learning model 110 can generate a risk score/level that can be displayed to the entity as described above in relation to FIGS. 1 and 2. Furthermore, based on this input, second machine learning model 112 can perform one or more risk mitigation actions based on the risk score. In one or more embodiments, a notification of the one or more risk mitigation actions performed can be displayed to the entity.

Figure 6:
FIG. 6 illustrates an example of prompt input and performance of risk mitigation actions in accordance with one or more embodiments described herein.

FIG. 6 illustrates an example of prompt input 600 and performance of risk mitigation actions in accordance with one or more embodiments described herein. As shown, an entity can input a prompt for the artificial intelligence product in accordance with one or more embodiments described herein. Further, one or more previous prompts can be stored and/or displayed in the prompt history. As described above in relation to FIGS. 1-2, third machine learning model 210 can classify the prompt into one or more deployment use case categories and generate an updated risk score based on the one or more deployment use case categories, the deployment profile and the one or more compliance mandates. Based on the updated risk score, fourth machine learning model 212 can perform one or more additional risk mitigation actions. As shown, the risk mitigation action performed in FIG. 6 comprises not answering the prompt, notifying the entity inputting prompts of relevant regulations, and enabling a communications link with a risk compliance officer.

FIG. 7 illustrates a flow diagram of an example, non-limiting, computer implemented method 700 that facilitates classification of AI use cases during development in accordance with one or more embodiments described herein. Repetitive description of like elements employed in other embodiments described herein is omitted for sake of brevity.

At 702, method 700 can comprise classifying, by a system (e.g., systems 102, 202 and/or first machine learning model 110) operatively coupled to a processor (e.g., processor 106), using a first machine learning model, a use case for an artificial intelligence product into a use case category. As described above in relation to FIGS. 1 and 2, an entity can provide a use case description and/or additional documentation to first machine learning model 110. Using natural language processing, first machine learning model 110 can classify the use case description as one or more use case classifications.

At 704, method 700 can comprise generating, by the system (e.g., systems 102, 202 and/or first machine learning model 110), using a first machine learning model, a risk score for the artificial intelligence product based on the use case category. As described above in relation to FIGS. 1 and 2, first machine learning model 110 can utilize the use case category, a deployment profile comprising information regarding the geographic region the artificial intelligence product will be released in, and one or more compliance mandates, to generate a risk score, wherein higher risk scores indicate greater compliance requirements and/or severe issues related to non-compliance.

At 706, method 700 can comprise performing, by the system (e.g., systems 102, 202 and/or second machine learning model 112) one or more risk mitigation actions based on the assigned risk score. For example, based on the assigned risk score, the use case classification and the one or more compliance mandates, second machine learning model 112 can identify one or more compliance requirements for the artificial intelligence product. For example, a policy may state that a compliance officer should be notified of any artificial intelligence products with a risk score above a specified threshold. In response to receiving a risk score above the specified threshold, second machine learning model 112 can automatically notify a compliance officer. In another example, if a compliance mandate specifies that a use case category in a specific geographic jurisdiction calls for a compliance audit, second machine learning model 112 can automatically generate an appropriate compliance audit based on the use case category and one or more development assets related to the artificial intelligence product provided by the entity developing the artificial intelligence product.

FIG. 8 illustrates a flow diagram of an example, non-limiting, computer implemented method 800 that facilitates classification of prompts fed to AI during deployment in accordance with one or more embodiments described herein. Repetitive description of like elements employed in other embodiments described herein is omitted for sake of brevity.

At 802, method 800 can comprise classifying, by a system (e.g., system 202 and/or third machine learning model 210) operatively coupled to a processor (e.g., processor 106), using a third machine learning model, prompts for an artificial intelligence product into a deployment use case category. As described above in relation to FIGS. 1 and 2, third machine learning model 210 can store one or more prompts given to an artificial intelligence product. Using natural language processing, third machine learning model 210 can classify the prompts as one or more deployment use case categories.

At 804, method 800 can comprise generating, by the system (e.g., system 202 and/or third machine learning model 210), using a third machine learning model, an updated risk score for the artificial intelligence product based on the deployment use case category. As described above in relation to FIGS. 1 and 2, third machine learning model 210 can utilize the deployment use case category, a deployment profile comprising information regarding the geographic region the artificial intelligence product is deployed in, and one or more compliance mandates, to generate an updated risk score, wherein higher risk scores indicate greater compliance requirements and/or severe issues related to non-compliance.

At 806, method 800 can comprise performing, by the system (e.g., system 202 and/or fourth machine learning model 212) one or more additional risk mitigation actions based on the updated risk score. For example, based on the updated risk score, the deployment use case classification and the one or more compliance mandates, fourth machine learning model 212 can identify one or more compliance requirements for the artificial intelligence product. For example, a policy may state that a compliance officer should be notified of any artificial intelligence products with a risk score above a specified threshold. In response to receiving a risk score above the specified threshold, fourth machine learning model 212 can automatically notify a compliance officer. In another example, if a compliance mandate specifies that a use case category in a specific geographic jurisdiction calls for a compliance audit, fourth machine learning model 212 can automatically generate an appropriate compliance audit based on the use case category and one or more development assets related to the artificial intelligence product provided by the entity developing the artificial intelligence product. In one or more further embodiments, fourth machine learning model 212 can compare the updated risk score with a risk score generated by first machine learning model 110 during development of the artificial intelligence product. If the updated risk score is unchanged from the original risk score, then fourth machine learning model 212 can refrain from performing additional risk mitigation actions.

Figure 9:
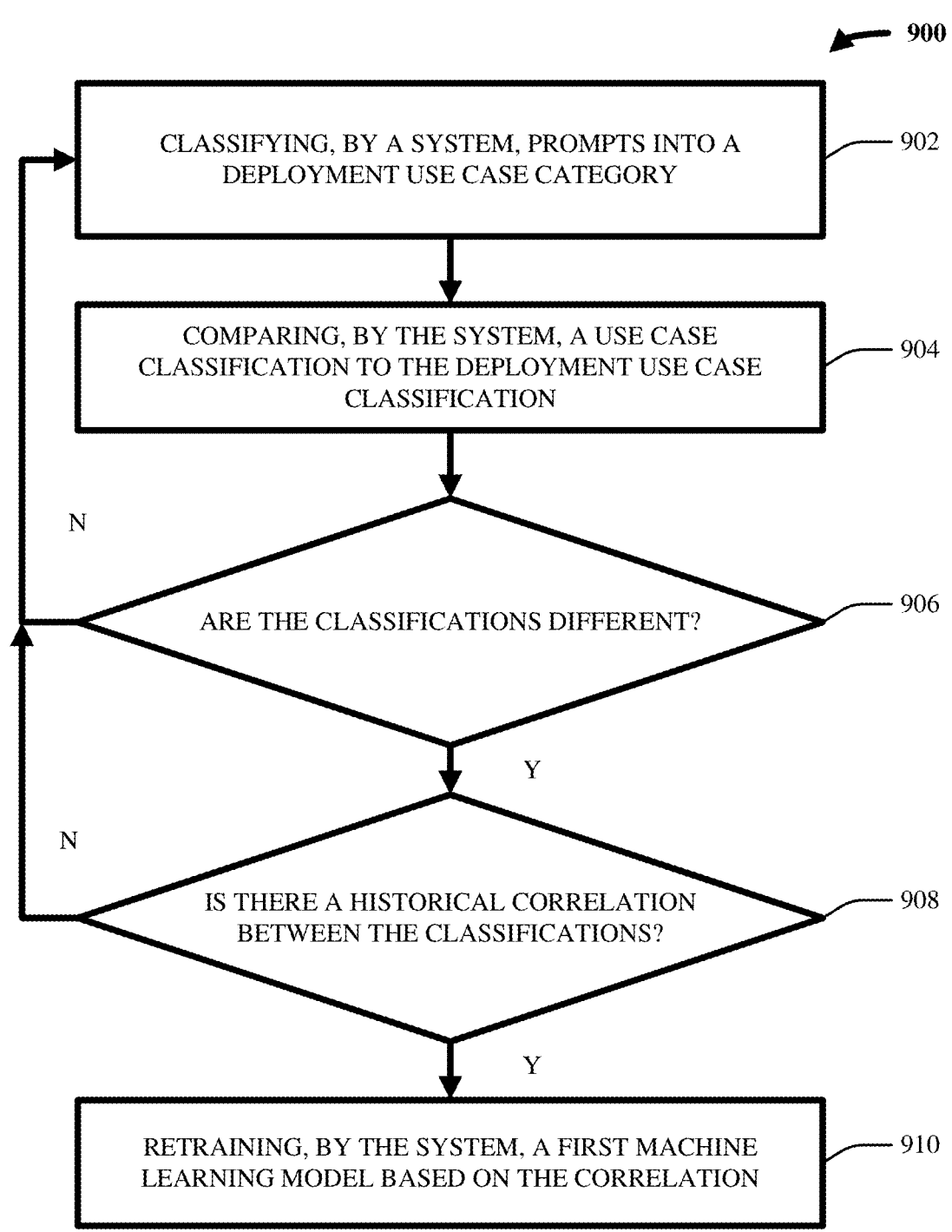
FIG. 9 illustrates a flow diagram of an example, non-limiting, computer implemented method that facilitates updated training of a machine learning model related to artificial intelligence use case classifications in accordance with one or more embodiments described herein.

FIG. 9 illustrates a flow diagram of an example, non-limiting, computer implemented method 900 that facilitates updated training of a machine learning model related to artificial intelligence use case classifications in accordance with one or more embodiments described herein. Repetitive description of like elements employed in other embodiments described herein is omitted for sake of brevity.

At 902, method 900 can comprise classifying, by a system (e.g., system 202 and/or third machine learning model 210) operatively coupled to a processor (e.g., processor 106), using a third machine learning model, prompts for an artificial intelligence product into a deployment use case category. As described above in relation to FIGS. 1 and 2, third machine learning model 210 can store one or more prompts given to an artificial intelligence product. Using natural language processing, third machine learning model 210 can classify the prompts as one or more deployment use case categories.

At 904, method 900 can comprise comparing, by the system (e.g., system 202 and/or training component 216), a previous use case category to the deployment use category. For example, as described above in relation to FIGS. 1 and 2, first machine learning model 110 can classify a use case of an artificial intelligence product in development into a use case category. During deployment of the artificial intelligence product, third machine learning component 210 can classify prompts given to the artificial intelligence product into a deployment use case category.

At 906, method 900 can comprise determining, by the system (e.g., system 202 and/or training component 216), if the use case category and the deployment use case category for the artificial intelligence product are different. In response to a NO determination, method 900 can return to step 902 and fourth machine learning model 212 can classify additional prompts for the artificial intelligence product. In response to a YES determination, method 900 can proceed to step 908.

At 908, method 900 can comprise determining, by the system (e.g., system 202 and/or training component 216), if there is a historical correlation between the different classifications. For example, training component 216 can store an index of all times different respective use case categories and deployment use case categories appear for various artificial intelligence products. If a repeated pairing between a first use case category classification during development and a second deployment use case category classification can indicate that artificial intelligence products developed for the first use case are often used for the second use case during deployment. In one or more embodiments, an entity can define a correlation threshold wherein if the pair of use case and deployment use case categories appears in more than a specified number of cases or in more than a specified percentage of cases, there is a historical correlation between the use case and deployment use case categories. In response to a NO determination, method 900 can return to step 902 and fourth machine learning model 212 can classify additional prompts for the artificial intelligence product. In response to a YES determination, method 900 can proceed to step 910.

At 910, method 900 can comprise retraining, by the system (e.g., system 202 and/or training component 212), a first machine learning model 110 based on the historical correlation. For example, if training component 212 determines there is a correlation between a first use case category during development and a second use case category during deployment, training component 212 can retrain first machine learning model 110 to associate the first use case category with the second use case category. In some embodiments, first machine learning model 212 can learn to classify use cases as both the first and second use case categories. In thin manner, first machine learning model 110 can better predict the actual deployment use case of an artificial intelligence product during development, in order to enable more proactive and accurate performance of risk mitigation actions by second machine learning model 112.

A practical application of systems 102 and 202 is that they enable automated classification of risks related to artificial intelligence use cases. As described above, entities that develop artificial intelligence products are often unaware of compliance mandates or legal restrictions related to use cases across varying legal and geographic regions. Accordingly, the systems and methods described herein allow for automated classification of use case categories, and identification of relevant compliance mandates and legal requirements in real time during development of artificial intelligence products. Furthermore, the methods and systems herein enable automated performance of one or more risk mitigation actions, thereby enabling compliance with ethical or legal requirements automatically. A further practical application of systems 102 and 202 is that they enable more accurate predictions of how the artificial intelligence products will be utilized during deployment. For example, by comparing the use case category classifications generated respectively by first machine learning model 110 and third machine learning model 210, training component 216 can identify historical correlation between use case categories assigned during development and use case categories assigned during use and deployment of the artificial intelligence products. By training first machine learning model 110 on these correlations, first machine learning model 110 can make more accurate classifications as to the future use of the artificial intelligence product, thereby enabling second machine learning model 112 to make more accurate choices as to which risk mitigation actions to perform, thereby enabling the performance of more effective risk mitigation actions proactively, rather than reactively. For example, if training component 216 discovers a historical correlation between a public relations use case category and a human resources use case category, training component 216 can train first machine learning model 110 to associate these two use case categories together, enabling first machine learning model 110 to more accurately classify future use case descriptions.

It is to be appreciated that systems 102 and 202 can utilize various combination of electrical components, mechanical components, and circuitry that cannot be replicated in the mind of a human or performed by a human as the various operations that can be executed by systems 102 and 202 and/or components thereof as described herein are operations that are greater than the capability of a human mind. For instance, the amount of data processed, the speed of processing such data, or the types of data processed by systems 102 and 202 over a certain period of time can be greater, faster, or different than the amount, speed, or data type that can be processed by a human mind over the same period of time. According to several embodiments, systems 102 and 202 can also be fully operational towards performing one or more other functions (e.g., fully powered on, fully executed, and/or another function) while also performing the various operations described herein. It should be appreciated that such simultaneous multi-operational execution is beyond the capability of a human mind. It should be appreciated that systems 102 and 202 can include information that is impossible to obtain manually by an entity, such as a human user. For example, the type, amount, and/or variety of information included in systems 102 and 202 can be more complex than information obtained manually by an entity, such as a human user.

FIG. 10 and the following discussion are intended to provide a brief, general description of a suitable computing environment 1000 in which one or more embodiments described herein at FIGS. 1-9 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as translation of an original source code based on a configuration of a target system by the use case classification code 1080. In addition to block 1080, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1080, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method can be distributed among multiple computers and/or between multiple locations. On the other hand, in this presentation of computing environment 1000, detailed discussion is focused on a single computer, specifically computer 1001, to keep the presentation as simple as possible. Computer 1001 can be located in a cloud, even though it is not shown in a cloud in FIG. 10. On the other hand, computer 1001 is not required to be in a cloud except to any extent as can be affirmatively indicated.

PROCESSOR SET 1010 includes one, or more, computer processors of any type now known or to be developed in the future. Processing circuitry 1020 can be distributed over multiple packages, for example, multiple, coordinated integrated circuit chips. Processing circuitry 1020 can implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set can be located "off chip." In some computing environments, processor set 1010 can be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods can be stored in block 1080 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory can be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 can be a read only memory (ROM), but typically at least a portion of the persistent storage allows writing of data, deletion of data and re-writing of data. Some familiar forms of persistent storage include magnetic disks and solid-state storage devices. Operating system 1022 can take several forms, such as various known proprietary operating systems or open-source Portable Operating System Interface type operating systems that employ a kernel. The code included in block 1080 typically includes at least some of the computer code involved in performing the inventive methods.

PERIPHERAL DEVICE SET 1014 includes the set of peripheral devices of computer 1001. Data communication connections between the peripheral devices and the other components of computer 1001 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 can include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 can be persistent and/or volatile. In some embodiments, storage 1024 can take the form of a quantum computing storage device for storing data in the form of qubits. In embodiments where computer 1001 is required to have a large amount of storage (for example, where computer 1001 locally stores and manages a large database) then this storage can be provided by peripheral storage devices designed for storing large amounts of data, such as a storage area network (SAN) that is shared by multiple, geographically distributed computers. IoT sensor set 1025 is made up of sensors that can be used in Internet of Things applications. For example, one sensor can be a thermometer and another sensor can be a motion detector.

NETWORK MODULE 1015 is the collection of computer software, hardware, and firmware that allows computer 1001 to communicate with other computers through WAN 1002. Network module 1015 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001) and can take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 can be a client device, such as thin client, heavy client, mainframe computer and/or desktop computer.

REMOTE SERVER 1004 is any computer system that serves at least some data and/or functionality to computer 1001. Remote server 1004 can be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data can be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs can be stored as images and can be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware and firmware allowing public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud. The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system comprising:
a memory that stores computer executable components; and
a processor that executes the computer executable components stored in the memory,
wherein the computer executable components comprise:
a first machine learning model that classifies a use case for an artificial intelligence product into a use case category and generates a risk score for the artificial intelligence product based on the use case category, a deployment profile and one or more compliance mandates, wherein the use case category is a category of one or more types of use to which the artificial intelligence product is applied comprising public relations uses, human resources usages, data analysis usage, human to system interactions, biometric identification usage, general purpose usage or other use case categories; and
a second machine learning model that receives the generated risk score, the deployment profile and the one or more compliance mandates and, based on the generated risk score, the deployment profile and the one or more compliance mandates, performs one or more risk mitigation actions based on the generated risk score, the deployment profile and the one or more compliance mandates, wherein the computer executable components further comprise a training component that retrains the first machine learning model based on a comparison of the use case category classification by the first machine learning model and a deployment use case category classification by a third machine learning model.

2. The system of claim 1, wherein the deployment profile comprises a geographic region for deployment of the artificial intelligence product and a list of one or more target organizations that will utilize the artificial intelligence product.

3. The system of claim 1, wherein the computer executable components further comprise:
the third machine learning model that stores prompts given to the artificial intelligence product, classifies the prompts into the deployment use category and generates an updated risk score for the artificial intelligence product based on the deployment use case category, the deployment profile and the one or more compliance mandates; and
a fourth machine learning model that performs one or more additional risk mitigation actions based on the generated updated risk score, the deployment profile and the one or more compliance mandates.

4. The system of claim 3, wherein the third machine learning model further receives one or more updated compliance mandates for one or more jurisdictions or target organizations and generates a second updated risk score for the artificial intelligence product based on the deployment use case category, the deployment profile and the one or more updated compliance mandates.

5. The system of claim 1, wherein the generating the risk score comprises:
identifying one or more relevant compliance mandates from the one or more compliance mandates based on the deployment profile;
and ranking severity of non-compliance of the one or more relevant compliance mandates.

6. The system of claim 1, wherein the one or more risk mitigation actions comprise at least one of blocking further development of the artificial intelligence product, blocking the artificial intelligence product from answering one or more prompts, notifying one or more entities of compliance requirements, and generation of one or more compliance audits.

7. A computer-implemented method comprising:
classifying, by a system operatively coupled to a processor, using a first machine learning model, a use case for an artificial intelligence product into a use case category, wherein the use case category is a category of one or more types of use to which the artificial intelligence product is applied;
generating, by the system, using the first machine learning model, a risk score for the artificial intelligence product based on the use case category, a deployment profile and one or more compliance mandates;
receiving, by the system, the generated risk score, the deployment profile and the one or more compliance mandates and, based on the generated risk score, the deployment profile and the one or more compliance mandate, performing, by the system, using a second machine learning model, one or more risk mitigation actions based on the generated risk score, the deployment profile and the one or more compliance mandates; and retraining, by the system, the first machine learning model based on a comparison of the use case category classification by the first machine learning model and a deployment use case category classification by a third machine learning model.

8. The method of claim 7, wherein the deployment profile comprises a geographic region for deployment of the artificial intelligence product and a list of one or more target organizations that will utilize the artificial intelligence product.

9. The method of claim 7, further comprising:

storing, by the system, prompts given to the artificial intelligence product;

classifying, by the system, using a third machine learning model, the prompts into the deployment use case category;

generating, by the system, using the third machine learning model, an updated risk score for the artificial intelligence product based on the deployment use case category, the deployment profile and the one or more compliance mandates; and performing, by the system, using a fourth machine learning model, one or more additional risk mitigation actions based on the generated updated risk score, the deployment profile and the one or more compliance mandates.

10. The method of claim 9, further comprising:

receiving, by the system, one or more updated compliance mandates for one or more jurisdictions or target organizations; and generating, by the system, a second updated risk score for the artificial intelligence product based on the deployment use case category, the deployment profile and the one or more updated compliance mandates.

11. The method of claim 7, wherein the generating the risk score comprises:

identifying, by the system, using the first machine learning model, one or more relevant compliance mandates from the one or more compliance mandates based on the deployment profile; and ranking, by the system, severity of non-compliance of the one or more relevant compliance mandates.

12. The method of claim 7, wherein the one or more risk mitigation actions comprise at least one of blocking further development of the artificial intelligence product, blocking the artificial intelligence product from answering one or more prompts, notifying one or more entities of compliance requirements, and generation of one or more compliance audits.

13. A computer program product, the computer program product comprising a computer readable storage medium having program instructions embodied therewith, the program instructions executable by a processor to cause the processor to:

classify, by the processor, using a first machine learning model, a use case for an artificial intelligence product into a use case category mandates, wherein the use case category is a category of one or more types of use to which the artificial intelligence product is applied comprising public relations uses, human resources usages, data analysis usage, human to system interactions, biometric identification usage, general purpose usage or other use case categories;

generate, by the processor, using the first machine learning model, a risk score for the artificial intelligence product based on the use case category, a deployment profile and one or more compliance mandates;

perform, by the processor, using a second machine learning model, one or more risk mitigation actions based on the generated risk score, the deployment profile and the one or more compliance mandates; and retrain, by the processor, the first machine learning model based on a comparison of the use case category classification by the first machine learning model and a deployment use case category classification by a third machine learning model.

14. The computer program product of claim 13, wherein the deployment profile comprises a geographic region for deployment of the artificial intelligence product and a list of one or more target organizations that will utilize the artificial intelligence product.

15. The computer program product of claim 13, wherein the program instructions are further executable to cause the processor to:

store, by the processor, prompts given to the artificial intelligence product;

classify, by the processor, using a third machine learning model, the prompts into the deployment use case category;

generate, by the processor, using the third machine learning model, an updated risk score for the artificial intelligence product based on the deployment use case category, the deployment profile and the one or more compliance mandates; and perform, by the processor, using a fourth machine learning model, one or more additional risk mitigation actions based on the generated updated risk score, the deployment profile and the one or more compliance mandates.

16. The computer program product of claim 15, wherein the program instructions are further executable to cause the processor to:

receive, by the processor, one or more updated compliance mandates for one or more jurisdictions or target organizations; and generate, by the processor, a second updated risk score for the artificial intelligence product based on the deployment use case category, the deployment profile and the one or more updated compliance mandates.

17. The computer program product of claim 13, wherein the one or more risk mitigation actions comprise at least one of blocking further development of the artificial intelligence product, blocking the artificial intelligence product from answering one or more prompts, notifying one or more entities of compliance requirements, and generation of one or more compliance audits.

\*    \*    \*    \*    \*